US012757277B2

(12) United States Patent
Dong

(10) Patent No.: US 12,757,277 B2
(45) Date of Patent: Oct. 6, 2026

(54) METHODS AND DEVICES FOR MULTI-LINK COMMUNICATION

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 396 days.

(21) Appl. No.: 18/258,581

(22) PCT Filed: Dec. 21, 2020

(86) PCT No.: PCT/CN2020/138047
§ 371 (c)(1),
(2) Date: Jun. 21, 2023

(87) PCT Pub. No.: WO2022/133654
PCT Pub. Date: Jun. 30, 2022

(65) Prior Publication Data

US 2024/0057195 A1 Feb. 15, 2024

(51) Int. Cl.

| | |
|---|---|
| ***H04W 76/20*** | (2018.01) |
| ***H04L 5/00*** | (2006.01) |
| ***H04L 67/55*** | (2022.01) |
| ***H04L 69/14*** | (2022.01) |
| ***H04W 48/08*** | (2009.01) |
| ***H04W 48/10*** | (2009.01) |
| ***H04W 76/15*** | (2018.01) |
| ***H04W 88/08*** | (2009.01) |

(52) U.S. Cl.
CPC ........... *H04W 76/20* (2018.02); *H04W 48/08* (2013.01)

(58) Field of Classification Search
CPC ..... H04W 76/20; H04W 48/08; H04W 88/08; H04W 48/10; H04W 76/15; H04L 67/55; H04L 69/14; H04L 5/0035; H04L 5/0053; H04L 5/00; Y02D 30/70
USPC .......................................................... 370/329
See application file for complete search history.

(56) References Cited

U.S. PATENT DOCUMENTS

| | | | | |
|---|---|---|---|---|
| 2015/0341914 | A1* | 11/2015 | Lee ........................ | H04W 72/23 370/329 |
| 2021/0274500 | A1* | 9/2021 | Cariou .................. | H04W 48/08 |
| 2021/0321410 | A1* | 10/2021 | Patil ........................ | H04L 45/24 |
| 2023/0071851 | A1* | 3/2023 | Gan ........................ | H04L 45/16 |

(Continued)

OTHER PUBLICATIONS

International Search Report and Written Opinion of International Application No. PCT/CN2020/138047, dated Aug. 30, 2021, 12 pages.

(Continued)

*Primary Examiner* — Xuan Lu
(74) *Attorney, Agent, or Firm* — Finnegan, Henderson, Farabow, Garrett & Dunner, L.L.P.

(57) ABSTRACT

A multi-link communication method is performed by a multi-link access point device, and includes: determining a first message frame on a first link, wherein the first message frame includes first information about a change in system information of an access point device corresponding to at least one link of a plurality of links, and the first message frame indicates a station on the at least one link to receive a second message frame sent by the access point device so as to acquire changed system information; and send the first message frame.

20 Claims, 2 Drawing Sheets

(56) References Cited

U.S. PATENT DOCUMENTS

| | | | | |
|---|---|---|---|---|
| 2023/0164831 A1* | 5/2023 | Kim | H04W 74/0808 | 370/329 |
| 2023/0262584 A1* | 8/2023 | Kim | H04W 28/08 | 370/338 |
| 2023/0403638 A1* | 12/2023 | Wu | H04W 48/16 | |

OTHER PUBLICATIONS

English translation of Notice of the first review opinion for Chinese Application No. 202080003945.2, dated Apr. 28, 2023, 11 pages.

Ming Gan et al., Huawei Technologies, Co. Ltd., "BSS parameter update for Multi-link Operation", doc.: IEEE 802.11-20/0503-02-00be, Apr. 1, 2020, 15 pages.

Yongho Seok et al., Media Tek Inc., "Multi-link BSS Parameter Update", doc.: IEEE 802.11-20/0337r2, Jun. 4, 2020, 15 pages.

Chitrakar Rojan et al., Panasonic Corporation, "Multi-link Element format", doc.: IEEE 802.11-20/0772r5, May 11, 2020, 12 pages.

Notice of Reasons for Refusal for Japanese Patent Application No. 2023-538088, dated Jun. 11, 2024, 9 pages.

* cited by examiner

METHODS AND DEVICES FOR MULTI-LINK COMMUNICATION

CROSS-REFERENCE TO RELATED APPLICATION

This application is a U.S. national phase application of international Patent Application No. PCT/CN2020/138047, filed on Dec. 21, 2020, the entire contents of which are incorporated herein by reference.

FIELD

The present disclosure relates to the field of communication, and more particularly to a multi-link communication method, and a multi-link communication device.

BACKGROUND

The current research scope of Wi-Fi technology is a bandwidth transmission at 320 MHz, aggregation and coordination of a plurality of frequency bands, etc. It is expected to increase the rate and throughput by at least four times compared with existing standards. Main application scenarios of Wi-Fi technology are a video transmission, augmented reality (AR), virtual reality (VR), etc.

The aggregation and coordination of the plurality of frequency bands refer to communications between devices in frequency bands of 2.4 GHz, 5 GHz, and 6 to 7 GHz at the same time. For the communication between devices in the plurality of frequency bands at the same time, it is necessary to define a new media access control (MAC) mechanism to manage it. In addition, it is also expected that the aggregation and coordination of the plurality of frequency bands can support a low-latency transmission.

The current multi-band aggregation and system technology support a maximum bandwidth of 320 MHz (160 MHz+160 MHz), and may also support 240 MHz (160 MHz+80 MHz), and other bandwidths.

SUMMARY

According to a first aspect of the present disclosure, a multi-link communication method is provided. The communication method may include determining a first message frame on a first link, in which the first message frame includes first information about a change in system information of an access point device corresponding to at least one link of a plurality of links, and the first message frame indicates a station on the at least one link to receive a second message frame sent by the access point device so as to acquire changed system information, and sending the first message frame.

According to a second aspect of the present disclosure, a multi-link communication method is provided. The communication method may include receiving a first message frame on a first link, in which the first message frame includes first information about a change in system information of an access point device corresponding to at least one link of a plurality of links, determining a link with a change in system information based on the first message frame, and receiving a second message frame sent by the access point device to acquire changed system information.

According to a third aspect of the present disclosure, an electronic device is provided. The electronic device includes a processor, and a memory storing a computer program executable by the processor. The processor is configured to implement the method as described above when running the computer program.

BRIEF DESCRIPTION OF THE DRAWINGS

Example embodiments of the present disclosure will be described in detail below with reference to the accompanying drawings.

DETAILED DESCRIPTION

Figure 1:
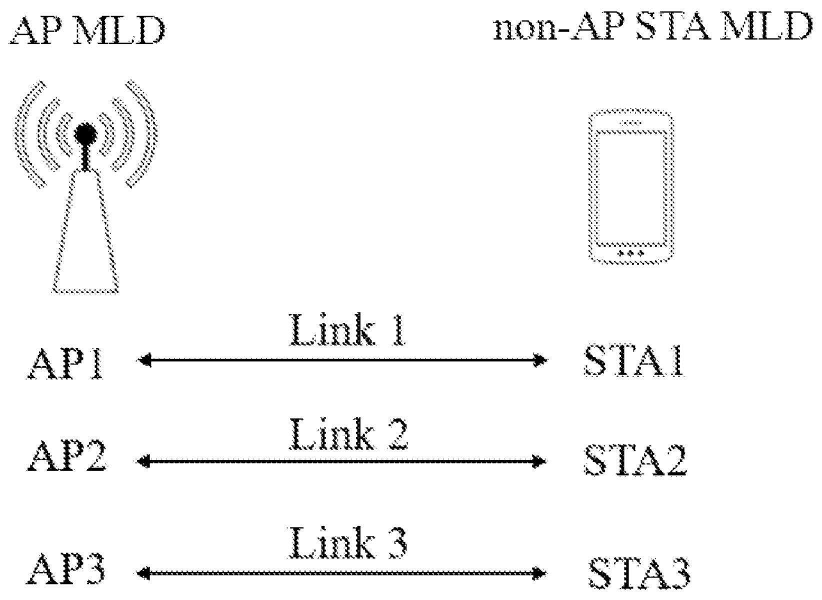
FIG. 1 is a schematic diagram showing a communication scenario on a plurality of links according to an embodiment.

The following description with reference to the accompanying drawings is provided to facilitate a comprehensive understanding of various embodiments of the present disclosure defined by the appended claims and their equivalents. The various embodiments of the present disclosure include various specific details, but these specific details are only considered illustrative. In addition, the description of well-known technologies, functions and constructions may be omitted for clarity and conciseness.

Terms and words used in the present disclosure are not limited to written meanings, but are used only by inventors to enable a clear and consistent understanding of the present disclosure. Therefore, for those skilled in the art, the descriptions of various embodiments of the present disclosure are provided only for the purpose of illustration, and but not for the purpose of limitation.

It is to be understood that "a", "an", "said" and "the" in singular forms used here can also include plural forms, unless clearly indicated in the context otherwise. It should be further understood that the word "including" used in the present disclosure refers to the existence of described features, integers, steps, operations, elements and/or assemblies, but does not exclude the existence or addition of one or more other features, integers, steps, operations, elements, assemblies and/or groups thereof.

It is to be understood that although the terms "first" and "second" and the like can be used herein to describe various elements, these elements should not be limited by these terms. These terms are only used to distinguish one element from another. Therefore, a first element discussed below may be referred to as a second element without departing from the teaching of the illustrative embodiments.

It is to be understood that when an element is referred to as being "connected," or "coupled" to another element, it may be directly connected or coupled to other elements, or intervening elements may also exist. In addition, as used herein, "connected," or "coupled" may include wireless connection or wireless coupling. The term "and/or" or the expression "at least one of . . . " used herein includes any and all combinations of one or more related listed items.

Unless otherwise defined, all terms (including technical and scientific terms) used herein have the same meaning as commonly understood by those skilled in the art to which this disclosure belongs.

In the related art, a station (STA) and an access point (AP) may be both a multi-link device (MLD), that is, it supports a function of performing simultaneous transmitting and/or receiving on a plurality of links at the same moment. Therefore, in the related art, there may be a plurality of links between the STA and the AP, and the communication between the two devices on the plurality of links is being studied.

However, in the related art, when system information of the access point changes, only a change of a single link may be identified. Therefore, requirements for the plurality of links that are being currently studied as mentioned above cannot be met.

FIG. 1 is a schematic diagram showing a communication scenario on a plurality of links.

In a wireless local area network, a basic service set (BSS) may be consisted of an access point (AP) and one or more stations (STAs) communicating with the AP. A basic service set may be connected to a distribution system (DS) through its AP, and then connected to another basic service set to form an extended service set (ESS).

The AP is a wireless switch for a wireless network, and is also the core of the wireless network. An AP device may be used as a wireless base station, and mainly used as a bridge for connecting wireless networks and wired networks. With this access point (AP), wired and wireless networks may be integrated.

The AP may include software applications and/or circuits to enable other types of nodes in the wireless network to communicate with the outside and inside of the wireless network through the AP. In some examples, as an example, the AP may be a terminal device or a network device equipped with a wireless fidelity (Wi-Fi) chip.

As an example, the station (STA) may include, but is not limited to, a cellular phone, a smart phone, a wearable device, a computer, a personal digital assistant (PDA), a personal communication system (PCS) device, a personal information manager (PIM), a personal navigation device (PND), a global positioning system, a multimedia device, an Internet of Things (IoT) device, and the like.

In an illustrative embodiment of the present disclosure, the AP and the STA may both a device supporting multiple links, for example, may be represented as an AP MLD and a non-AP STA MLD, respectively. For ease of description, an example in which an AP communicates with a STA on a plurality of links is mainly described below. However, the illustrative embodiment of the present disclosure is not limited thereto.

In FIG. 1, the AP MLD may represent an access point supporting a multi-link communication function, and the non-AP STA MLD may represent a station supporting a multi-link communication function, merely as an example. Referring to FIG. 1, the AP MLD may work on three links, such as an AP1, an AP2, and an AP3 as shown in FIG. 1, and the non-AP STA MLD may also work on three links, such as a STA1, a STA2, and a STA3 as shown in FIG. 1. In the example of FIG. 1, it is assumed that the AP1 communicates with the STA1 through a corresponding first link (Link 1), and similarly, the AP2 and the AP3 communicate with the STA2 and the STA3 through a second link (Link 2) and a third link (Link 3), respectively. In addition, the Link 1 to the Link 3 may be a plurality of links at different frequencies, for example, links at 2.4 GHz, 5 GHz, and 6 GHz, or several links with the same or different bandwidths at 2.4 GHz. In addition, a plurality of channels may exist on each link. However, it is to be understood that the communication scenario shown in FIG. 1 is merely illustrative, and the inventive concept is not limited thereto. For example, the AP MLD may be connected to a plurality of non-AP STA MLDs, or the AP may communicate with a plurality of other types of stations on each link.

In addition, although it is shown in FIG. 1 that the first link (Link 1) to the third link (Link 3) all belong to the same AP MLD, the embodiment of the present disclosure is not limited thereto. For example, the first link (Link 1) to the third link (Link 3) may be a link shared by the AP MLD shown in FIG. 1 and other AP MLDs.

If system information of the access point changes, it is identified by a specific identifier bit in a change sequence field or a traffic indication map (TIM) frame, such as a check beacon subfield which will be described later with reference to Tables 1 to 5.

According to the embodiment of the present disclosure, when there are a plurality of links between the access point and the station, a change in the system information of the AP may be sent to the station through an AP belonging to the AP MLD, and changes in the system information of other APs may also be sent through the AP. This will be described in detail next with reference to FIG. 2. In addition, for ease of description, the embodiment of the present disclosure will be described mainly with reference to a traffic indication map (TIM) message frame (hereinafter abbreviated as "TIM frame"). However, the present disclosure is not limited thereto, and other information for notifying the change in system information is also feasible.

Figure 2:
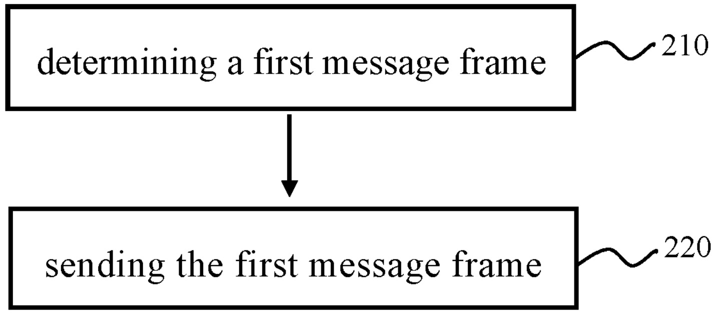
FIG. 2 is a flow chart showing a communication method according to an embodiment.

FIG. 2 is a flow chart showing a communication method according to an embodiment of the present disclosure. The communication method shown in FIG. 2 may be performed by a multi-link access point device.

Referring to FIG. 2, in an operation 210, a first message frame may be determined, for example, on a first link. Tn an embodiment of the present disclosure, there may be many ways to determine the first message frame. For example, the access point device may generate the first message frame according to at least one of: a network condition, a load condition, a hardware capability of a transmitting/receiving device, a service type, and a relevant protocol provision, and this is not particularly limited in the embodiment of the present disclosure. In the embodiment of the present disclosure, the access point device may also acquire the first message frame from an external device, and this is not particularly limited in the embodiment of the present disclosure.

According to the embodiment, the first message frame may include first information about a change in system information of an access point device corresponding to at least one link of a plurality of links. The first information will be described in detail later with reference to Tables 1 to 5. In the embodiment of the present disclosure, the plurality of links may be links capable of being supported by the multi-link access point device (AP MLD). In addition, the at least one link of the plurality of links may belong to a same AP MLD or may be a link shared with other AP MLDs, both of which will be described in detail below, respectively.

The first link may be a link that communicates with a station in the plurality of links supported by the AP MLD. The first information determined on the first link may identify a change in system information of an access point device corresponding to the first link, and may also identify changes in system information of access point devices corresponding to other links different from the first link. For example, referring to the embodiment of FIG. 1, when the first link is the Link 1 as shown in FIG. 1, the access point device corresponding to the first link may be the AP1, then the first information may indicate a change in system information of the AP1, and may also indicate changes in system information of access point devices on other links (for example, an AP2 and/or an AP3).

According to an embodiment, the first message frame may indicate a station on the at least one link to receive a second message frame sent by the access point device so as to acquire changed system information. That is, when the station receives the first message frame, a link with a change in system information may be determined according to the first information in the first message frame, and a station corresponding to the link is ready to receive the second message frame carrying the changed system information.

In the embodiment of the present disclosure, the first information carried in the first message frame merely identifies the change in the system information (for example, whether the system information has changed), and a specific content of the changed system information may be carried in the second message frame, so that resources and time required to send the first message frame and the second message frame may be saved when the system information has not changed. According to the embodiment, the first message frame may be a TIM frame, and the first information indicating the change in the system information may be carried in the TIM frame. The second message frame may be a beacon frame, and a specific content of the changed system information may be carried in the beacon frame. However, this is merely illustrative, the embodiment of the present disclosure is not limited thereto, and other suitable types of frames are also feasible.

According to the embodiment of the present disclosure, the change in the system information may refer to a critical update of an element in the beacon frame, and at least one of the following events may be classified as the critical update:

a) Inclusion of a channel switch announcement element,
b) Inclusion of an extended channel switch announcement element,
c) Modification of the EDCA parameters element,
d) Inclusion of a quiet element,
e) Modification of the DSSS parameter set,
f) Modification of the HT operation element,
g) Inclusion of a wide bandwidth channel switch element,
h) Inclusion of a channel switch wrapper element,
i) Inclusion of an operating mode notification element,
j) Inclusion of a quiet channel element,
k) Modification of the VHT operation element,
Modification of the HE operation element,
n) Insertion of a broadcast TWT element,
o) Inclusion of the BSS color change announcement element,
p) Modification of the MU EDCA parameter set element,
q) Modification of the spatial reuse parameter set element,
r) Modification of the UORA parameter set element, etc.

When the at least one of the events shown above occurs, the system information changes. However, it is to be understood that the events shown above are merely illustrative, the embodiment of the present disclosure is not limited thereto, and other system information events are also feasible.

In step 220, the first message frame may be sent. For ease of description, a link for sending the first message frame in step 220 may be the same as the link for determining the first message frame in step 210. However, this is merely illustrative, and the present disclosure is not limited thereto. For example, the link for determining the first message frame in step 210 may also be different from the link for sending the first message frame in step 220. When the station receives the first message frame, it may parse information included in the first message frame, for example, the first information, so as to acquire the change in the system message.

A case that at least one link with a change in system information all belong to a same AP MLD is described below. That is, merely the change in the system information of the same AP MLD needs to be identified.

According to an embodiment, the first information may include a first identifier. The first identifier may be configured to indicate the change in the system information on the at least one link of the plurality of links.

According to an embodiment, the first information may also include a second identifier. The second identifier may correspond to the at least one link of the plurality of links.

As an illustrative embodiment, the first information may have a format as shown in Table 1 below.

TABLE 1

Format of First Information

| Category | Unprotected WNM Action | Check Beacon | Link ID 1 | . . . | Check Beacon | Link ID n | Timestamp | TIM Element |
|---|---|---|---|---|---|---|---|---|

The check beacon in Table 1 may be an example of the first identifier, and link identifiers (link ID 1 to link ID n in Table 1, where n is an integer greater than or equal to 1) may be examples of the second identifier. The first identifier (for example, check beacon) is an unsigned integer, which is initialized to 0. When system information of an access point device on a corresponding link changes, a value of the first identifier (for example, check beacon) may be changed. For example, the value of the first identifier may be increased. In an embodiment, a value of the changed first identifier may be a value obtained from the changed value (for example, the increased value) modulo 256. However, this is merely illustrative, and the present disclosure is not limited thereto. Other ways of taking values that may reflect the change in the system information are also feasible. The station may determine whether the value of the first identifier is the same as a previously received value when receiving the first message frame. If it is different, it indicates that a system on the corresponding link has changed.

The second identifiers (for example, the link identifiers link ID 1 to link ID n) may correspond to a link with a change in system information. In an embodiment, the second identifier may have 4 bits for identifying a link with a change in system information. However, this is merely illustrative, and the present disclosure is not limited thereto. The second identifier may have more or less bits. In the format of the first information shown in Table 1, the first identifier and the second identifier exist in pairs in the first message frame in response to the change in the system information on the at least one link of the plurality of links. That is, the check beacon and the link ID will appear in pairs merely when the system information (SI) on the link changes. The station receiving the first message frame may determine on which links the system information changes according to the first identifier and the second identifier in the first information.

Referring to Table 1, the first information may further include a traffic indication map (TIM) element. As an example, a format of the TIM element in Table 1 may be as shown in Table 2 below.

TABLE 2

| Format of TIM element | | | | | |
|---|---|---|---|---|---|
| Element ID | Length | DTIM Count | DTIM Period | Bitmap Control | Partial Virtual Bitmap |

Although merely one TIM element is shown in Table 1, the present disclosure is not limited thereto. In the first message frame, the number of TIM elements is related to the number of links with changes in system information in the plurality of links. In an example, when the second identifiers (link identifiers link ID 1 to link ID n) in Table 1 correspond to the link with the change in the system information, the number of the TIM elements may be the same as the number of the second identifiers (link identifiers link ID 1 to link ID n) to indicate the TIM element corresponding to each link identifier.

As another illustrative embodiment, the first information may have a format as shown in Table 3 below.

TABLE 3

| Format of First Information | | | | | |
|---|---|---|---|---|---|
| Category | Unprotected WNM Action | Check Beacon | Link ID set | Timestamp | TIM Element |

The check beacon in Table 3 may be an example of the first identifier, and the link identifier set (the link ID set in Table 3) may be an example of the second identifier.

The first identifier (for example, check beacon) may be an unsigned integer, which is initialized to 0. The second identifier. (for example, the link ID set) may include a plurality of bits, in which the plurality of bits correspond to the plurality of links, respectively. That is, compared with Table 2, the link ID set in Table 3 may correspond to all links, not merely to the link with the change in the system information. In an embodiment, the second identifier (for example, the link ID set) may have 8 bits, and each bit corresponds to a link. However, this is merely illustrative, and the present disclosure is not limited thereto. The second identifier may have more or less bits according to a hardware and/or software configuration of the AP MLD.

According to the embodiment, a value of the first identifier is changed, and a bit of the plurality of bits corresponding to the first link included in the second identifier is set to a first value in response to a change in system information on the first link. Specifically, the check beacon in Table 3 may be changed (in a way similar to the embodiment described above with reference to Table 2), and the bit corresponding to the first link in the link ID set may be set to the first value (for example, 1) in response to a change in the system information of the access point device corresponding to the first link for determining and sending the first message frame. Referring to FIG. 1, it is assumed that Link 1 to Link 3 correspond to bits B0 to B2 in a link ID set, respectively, and the first link corresponds to Link 1. In the first message frame, the first identifier (check beacon) may be changed (for example, increased), the bit B0 of the second identifier (for example, the link ID set) may be set to the first value (for example, 1), and the bits B1 and B2 of the second identifier (for example, the link ID set) may be set to a second value (for example, 0), in response to a change in system information of the access point device (AP1) corresponding to the Link 1 and no change in system information of the access point devices (AP2 and AP3) corresponding to other links. In the first message frame, the first identifier (check beacon) may be changed (for example, increased), the bits B0 and B2 of the second identifier (for example, the link ID set) may be set to the first value (for example, 1), and the bit B1 of the second identifier (for example, the link ID set) may be set to the second value (for example, 0), in response to changes in system information of the access point devices (AP1 and AP3) corresponding to the Link 1 and the Link 3 but no change in system information of the access point device (AP2) corresponding to the Link 2.

According to an embodiment, a value of the first identifier is not changed, and bits of the plurality of bits corresponding to other links different from the first link are set to a first value in response to no change in system information on the first link but changes in system information on the other links. Under the assumption described above, in the first message frame, the first identifier (check beacon) remains unchanged, and B1 and B2 of the second identifier (for example, the link ID set) may be set to the first value (for example, 1), and B0 of the second identifier (for example, the link ID set) may be set to the second value (for example, 0), in response to no change in the system information of the access point device (AP1) corresponding to the first link (Link 1), but changes in the system information of the access point devices (AP2 and AP3) corresponding to the Link 2 and the Link 3.

The embodiment described with reference to Table 3 may achieve backward compatibility, and may avoid parsing errors when an old station receives the first message frame.

The format of the TIM element in Table 3 may be the same as that shown in Table 2. Although merely one TIM element is shown in Table 3, the present disclosure is not limited thereto. In the first message frame, the number of TIM elements is related to the number of the plurality of links. For example, the number of TIM elements may be the same as the number of bits of the second identifier (the link ID set), and an order in which TIM elements appear in the first message frame may correspond to the plurality of links.

The above describes the case that the link with the change in the system information all belong to the same AP MLD. It is to be understood that in this case, contents contained in the first information shown in Table 1 or Table 3 are merely illustrative, and the present disclosure is not limited thereto. Some contents in Table 1 and Table 3 may be omitted or other contents may be added. For example, the first information shown in Table 1 or Table 3 may also include a time offset subfield, which is configured to indicate that a time offset between a beacon frame (for example, a TBTT beacon frame) sent on a link where the first message frame (for example, the TIM frame) is received subsequently and a beacon frame (for example, a TBTT beacon frame) sent on a link with a change in system message.

The above describes the case that the link with the change in the system information all belong to the same AP MLD. In this case, a format of a new first message frame (for example, the TIM frame) is defined, which is embodied as an extension to a check beacon field. For example, a link ID or link ID set field is added after the check beacon field, where the link ID may be four bits, the link TD set field is eight bits, a bit corresponds to a link, and its specific format may be shown in Table 1 and Table 3, respectively. According to the embodiment, for Table 1, the check beacon and the Link ID appear in pairs merely when the system information on the link changes. According to the embodiment, for Table 3, considering the backward compatibility, a value of the check beacon is changed, and a corresponding bit of the link ID set is set to “1” in response to a change in ST on a sending link (for example, the above-mentioned first link). A value of the check beacon is not changed in response to no change in SI on a sending link, but a corresponding bit of the link ID set is set to “1” in response to changes in SI on the other links. The methods described with reference to Table 1 to Table 3 are all newly defined fields, and the station needs to parse the first identifier (the check beacon field) in the first message frame when receiving the first message frame. In addition, in the embodiment of the present disclosure, the number of TIM elements that appear is related to a change in system information on each link, or the number of TIM elements that appear is equal to the number of links that exist.

A case that links with changes in system information belong to different AP MLDs will be described in the following. That is, changes in system information of other AP MLDs need to be identified.

In this case, the first information may have formats as shown in Tables 4 and 5 below.

multi-link access point device (which may be referred to as a “current multi-link access point device” below) described in the first link for determining and sending the first message frame. Since the station has learned (for example, in a process of establishing an associated link) information (e.g. the MAC address) of the multi-link access point device when communicating with the first link, the first information may not include the multi-link device identifier of the multi-link access point device, but merely includes identifiers of other multi-link devices (for example, the MLD ID I and the MLD ID II).

The check beacon to link ID n in Table 4 may be similar to those described in Table 1. In addition, the first identifier (for example, the check beacon I and the check beacon H) and the second identifier (for example, the link ID I and the link ID II) for each multi-link device (for example, multi-link devices indicated by the MLD TD T and the MLD ID II, respectively), may be similar to the first identifier and the second identifier described with reference to Table 1, and repeated descriptions are omitted for brevity.

The check beacon and the link ID set in Table 5 may be similar to those described in Table 3. In addition, the first identifier (for example, the check beacon I and the check

TABLE 4

| Format of First Information | | | | | | | | | | | | |
|---|---|---|---|---|---|---|---|---|---|---|---|---|
| Check Beacon | Link ID 1 | . . . | Link ID n | Check Beacon I | MLD ID I | Link ID I | Time offset I | Check Beacon II | MLD ID II | Link ID II | Time offset II | . . . |

TABLE 5

| Format of First Information | | | | | | | | | | |
|---|---|---|---|---|---|---|---|---|---|---|
| Check Beacon | Link ID set | MLD ID I | Check Beacon I | Link ID set I | Time offset I | MLD ID II | Check Beacon II | Link ID set II | Time offset II | . . . |

For ease of description, some of the contents included in Tables 1 to 3 are omitted in Tables 4 and 5. However, it is to be understood that Tables 4 and 5 may include these omitted contents. In addition, it may be understood that each element shown in Tables 1 to 5 exists independently, and these elements are illustratively listed in a same table, but do not represent that all of the elements in the table must exist simultaneously as indicated in the table. A value of each element is independent of a value of any other element in Tables 1 to 5. Therefore, those skilled in the art may understand that the value of each element in the table in the present disclosure is an independent embodiment.

Referring to Table 4 and Table 5, the first information may also include a multi-link device identifier, such as the MLD ID I and the MLD ID II in Table 4 and Table 5. The multi-link device identifier corresponds to a multi-link device to which a link with a change in system information belongs. In an embodiment, the multi-link device identifier may be a media access control (MAC) address of the multi-link device. It is to be understood that although two multi-link device identifiers (the MLD ID I and the MLD ID II) are shown in Table 4 and Table 5, the concept of the present disclosure is not limited thereto, and more or less multi-link device identifiers may be included according to the link with the change in the system information.

The check beacon to link ID n in Table 4 (similar to those in Table 1) and the check beacon and the link ID set in Table 5 (similar to those in Table 3) may correspond to the beacon H) and the second identifier (for example, the link ID set I and the link ID set II) for each multi-link device (for example, multi-link devices indicated by the MLD ID I and the MLD ID H, respectively) may be similar to the first identifier and the second identifier described with reference to Table 3, and repeated descriptions are omitted for brevity.

In addition, for each multi-link device, the first information may also include the TIM elements as shown in Table 2. The number of TIM elements may be related to the number of links with changes in system information in the plurality of links supported by the multi-link device, or may be related to the number of the plurality of links supported by the multi-link device. That is, for each multi-link device, the TIM element may be similar to the embodiment described with reference to Table 2, and repeated descriptions are omitted here for brevity.

In case that the links with the changes in the system information belong to different AP MLDs, in Tables 4 and 5, moments at which a beacon frame (for example, a TBTT beacon frame) is sent subsequently are different on each link for different AP MLDs (with different multi-link device identifiers (MLD IDs)). Therefore, a respective time offset is set corresponding to each MLD ID. The respective time offset is configured to indicate that the time offset between the TBTT beacon frame sent on the link where the first message frame (for example, the TIM frame) is received subsequently and the TBTT beacon frame sent on the link with the change in the system message.

It is to be understood that formats of the first information shown in Tables 4 and 5 are merely illustrative. Other contents may be included according to the concept of the present disclosure. For example, the first information may also include a third identifier (not shown), which is configured to indicate that changes in system information of different access point devices are the same.

Specifically, for example, a second link in the plurality of links may be a link shared by the first multi-link access point device and the second multi-link access point device. In the first multi-link access point device, the second link corresponds to the first access point device, and in the second multi-link access point device, the second link corresponds to the second access point device. The first information may include a third identifier, which is configured to indicate that a change in system information of the first access point device is the same as a change in system information of the second access point device. It is to be understood that the first multi-link access point device or the second multi-link access point device may be a current multi-link access point device, a multi-link device corresponding to the MLD ID I, or a multi-link device corresponding to the MLD ID II.

According to the embodiment, in case that the change in the system information of the first access point device is the same as the change in the system information of the second access point device, merely a third message frame (for example, a beacon frame) may be sent to carry system information with a same change of the first access point device and the second access point device. That is, a plurality of beacon frames are not sent, respectively, to carry changed system information in response to the same change in system information of access point devices in different multi-link devices to which a same link belongs, so that a signaling may be saved.

According to the embodiment, in case that the change in the system information of the first access point device is different from the change in the system information of the second access point device, an additional third identifier is not needed. Instead, the first information shown in Table 4 and Table 5 may be used to notify a station which system information on a link has changed, and then different message frames (for example, beacon frames) may be sent, respectively, to carry system information corresponding to a corresponding access point device. In an embodiment of the present disclosure, message frames (for example, the second message frame and the third message frame shown above) carrying the changed system information may be sent on links with changes in system information, or may be sent by other links, which is not specifically limited by the present disclosure.

In the embodiment of the present disclosure, if other AP MLDs need to be identified, an AP MLD identifier, which may be an MLD MAC address, needs to be added.

The communication method shown in FIG. 2 may be applied to the changes in the system information on the plurality of links, which improves spectrum utilization efficiency and improves the throughput.

Figure 3:
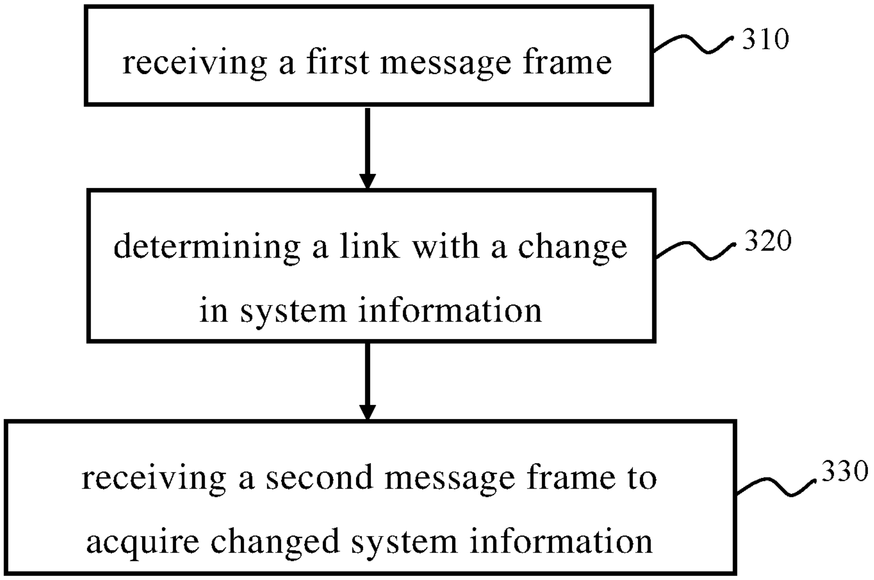
FIG. 3 is a flow chart showing another communication method according to an embodiment.

FIG. 3 is a flow chart showing another communication method according to an embodiment. The communication method shown in FIG. 3 may be performed by a multi-link station device.

Referring to FIG. 3, in step 310, a first message frame may be received on a first link, in which the first message frame includes first information about a change in system information of an access point device corresponding to on least one link of a plurality of links.

In step 320, a link with a change in system information may be determined based on the first message frame.

In step 330, a second message frame (for example, a beacon frame) sent by the access point device may be received to acquire changed system information.

According to an embodiment of the present disclosure, the first information includes a first identifier, in which the first identifier is configured to indicate the change in the system information on the at least one link of the plurality of links.

According to an embodiment of the present disclosure, the first information further includes a second identifier, in which the second identifier corresponds to the at least one link of the plurality of links.

According to an embodiment of the present disclosure, the second identifier corresponds to a link with a change in system information, in which step 320 may include determining a link with a change in system information in the plurality of links based on the first identifier and the second identifier existing in pairs in the first message frame.

According to an embodiment of the present disclosure, the second identifier may include a plurality of bits, in which the plurality of bits correspond to the plurality of links, respectively.

According to an embodiment of the present disclosure, step 320 may include determining a link with a change in system information as the first link in response to determining that a value of the first identifier is changed and a bit of the plurality of bits corresponding to the first link is set to a first value.

According to an embodiment of the present disclosure, step 320 may include determining that system information has not changed on the first link, and the system information has changed on a link corresponding to at least one bit of the plurality of bits in response to determining that a value of the first identifier has not changed and the at least one bit is set to a first value.

According to an embodiment of the present disclosure, the first information further includes a multi-link device identifier, in which the multi-link device identifier corresponds to a multi-link device to which a link with a change in system information belongs.

According to an embodiment of the present disclosure, the plurality of links includes a second link corresponding to a first multi-link access point device and a second multi-link access point device, in which in the first multi-link access point device, the second link corresponds to a first access point device, and in the second multi-link access point device, the second link corresponds to a second access point device, in which the first information includes a third identifier, which is configured to indicate that a change in system information of the first access point device is the same as a change in system information of the second access point device. According to the embodiment of the present disclosure, the station may determine, based on the third identifier, that changes in system information of the first access point device and the second access point device corresponding to the second link are the same. Therefore, the changed system information may be obtained according to a message frame (for example, a beacon frame) sent subsequently by the access point device.

According to an embodiment of the present disclosure, the first information may further include a traffic indication map (TIM) element. According to the embodiment of the present disclosure, the number of traffic indication map (TIM) elements is related to the number of links with changes in system information in the plurality of links.

According to the embodiment of the present disclosure, the number of traffic indication map (TIM) elements is related to the number of the plurality of links.

The first information and the TIM element may be similar to the embodiment described with reference to Tables 1 to 5, and repeated descriptions are omitted here for brevity. When receiving the first message frame, the station may parse the first information (for example, a check beacon and/or a link ID/link ID set) included in the first message frame to determine an access point device corresponding to a link with a change in system information, and may then receive a message frame carrying the changed system information.

Step 310 of FIG. 3 may correspond to operations described in steps 210 and 220 of FIG. 2, and step 330 may correspond to the embodiment described above with respect to the second message frame and the third message frame, and repeated descriptions are omitted here for brevity.

Figure 4:
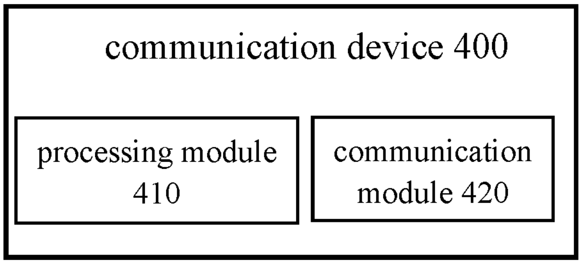
FIG. 4 is a block diagram showing a communication device according to an embodiment.

FIG. 4 is a block diagram showing a communication system according to an embodiment of the present disclosure.

Referring to FIG. 4, a communication device 400 may include a processing module 410 and a communication module 420. The communication device shown in FIG. 4 may be performed by an AP MLD, or a non-AP STA MLD.

In a case that the communication device shown in FIG. 4 is performed by the AP MLD, the processing module 410 may be configured to determine a first message frame on a first link, in which the first message frame includes first information about a change in system information of an access point device corresponding to at least one link of a plurality of links, and the first message frame indicates a station on the at least one link to receive a second message frame sent by the access point device so as to acquire changed system information. The communication module 420 may be configured to send the first message frame. In this case, the communication device 400 may perform the communication method described with reference to FIG. 2, and repeated descriptions are omitted here for brevity.

In a case that the communication device shown in FIG. 4 is performed by the non-AP STA MLD, the communication module 420 may be configured to receive a first message frame on a first link, in which the first message frame includes first information about a change in system information of an access point device corresponding to at least one link of a plurality of links. The processing module may be configured to determine a link with a change in system information based on the first message frame and control the communication module to receive a second message frame sent by the access point device to acquire changed system information. In this case, the communication device 400 may perform the communication method described with reference to FIG. 3, and repeated descriptions are omitted here for brevity.

In addition, the communication device 400 shown in FIG. 4 is merely illustrative, and embodiment of the present disclosure is not limited thereto. For example, the communication device 400 may also include other modules, such as a memory module, etc. In addition, each module in the communication device 400 may be combined into a more complex module or may be divided into more individual modules.

The communication method and the communication device according to the embodiment of the present disclosure may be applied to the changes in the system information on the plurality of links, which improves spectrum utilization efficiency and improves the throughput.

Based on the same principle as the method provided by the embodiments of the present disclosure, an embodiment of the present disclosure also provides an electronic device, which includes a processor and a memory. Machine-readable instructions (which also can be referred to as "computer programs") are stored in the memory. The processor is configured to execute the machine-readable instructions to implement the method described with reference to FIGS. 2 and 3.

An embodiment of the present disclosure also provides a computer-readable storage medium having stored therein computer programs that, when executed by a processor, cause the method described with reference to FIGS. 2 and 3 to be implemented.

In an illustrative embodiment, the processor may be a logic block, a module and a circuit for implementing or executing various examples described in connection with the present disclosure, such as a central processing unit (CPU), a generic processor, a digital signal processor (DSP), an application specific integrated circuit (ASIC), a field programmable gate array (FPGA) or other programmable logic devices, transistor logic devices, hardware components or any combination thereof. The processor can also be a combination that implements computing functions, such as including a combination of one or more microprocessors, and a combination of the DSP and the microprocessor.

In an illustrative embodiment, the memory may be, for example, a read only memory (ROM), a random access memory (RAM), an electrically erasable programmable read only memory (EEPROM), a compact disc read only memory (CD-ROM) or other optical disc storage, optical disk storage (including compact disk, laser disk, optical disk, digital versatile disk, Blu-ray disk, etc.), magnetic disc storage media or other magnetic storage devices, or any other media that can be used to carry or store program codes in the form of instructions or data structures and can be accessed by a computer, but is not limited to this.

According to a first aspect of the present disclosure, there is provided a multi-link communication method, which is performed by a multi-link access point device. The multi-link communication method includes determining a first message frame on a first link, in which the first message frame includes first information about a change in system information of an access point device corresponding to at least one link of a plurality of links, and the first message frame indicates a station on the at least one link to receive a second message frame sent by the access point device so as to acquire changed system information, and sending the first message frame.

In some embodiments, the first information includes a first identifier, in which the first identifier is configured to indicate the change in the system information on the at least one link of the plurality of links.

In some embodiments, the first information further includes a second identifier, in which the second identifier corresponds to the at least one link of the plurality of links.

In some embodiments, the change in the system information is determined on the at least one link of the plurality of links, and the first identifier and the second identifier exist in pairs in the first message frame, in which the second identifier corresponds to a link with a change in system information.

In some embodiments, the second identifier includes a plurality of bits, in which the plurality of bits correspond to the plurality of links, respectively.

In some embodiments, a change in system information is determined on the first link, a value of the first identifier is changed, and a bit of the plurality of bits corresponding to the first link is set to a first value.

In some embodiments, no change in system information is determined on the first link but changes in system information are determined on the other links, a value of the first identifier is not changed, and bits of the plurality of bits corresponding to other links different from the first link are set to a first value.

In some embodiments, the first information further includes a multi-link device identifier, in which the multi-link device identifier corresponds to a multi-link device to which a link with a change in system information belongs.

In some embodiments, the multi-link device identifier is a media access control (MAC) address of the multi-link device.

In some embodiments, the plurality of links include a second link corresponding to a first multi-link access point device and a second multi-link access point device, in which in the first multi-link access point device, the second link corresponds to a first access point device, and in the second multi-link access point device, the second link corresponds to a second access point device, in which the first information includes a third identifier, which is configured to indicate that a change in system information of the first access point device is the same as a change in system information of the second access point device.

In some embodiments, the communication method further includes sending a third message frame to carry system information with a same change of the first access point device and the second access point device.

In some embodiments, the first information further includes a traffic indication map (TIM) element.

In some embodiments, the number of traffic indication map (TIM) elements is related to the number of links with changes in system information in the plurality of links.

In some embodiments, the number of the traffic indication map (TIM) elements is related to the number of the plurality of links.

According to a second aspect of the present disclosure, there is provided a multi-link communication method, which is performed by a multi-link station device. The multi-link communication method includes receiving a first message frame on a first link, in which the first message frame includes first information about a change in system information of an access point device corresponding to at least one link of a plurality of links, determining a link with a change in system information based on the first message frame, and receiving a second message frame sent by the access point device to acquire changed system information.

In some embodiments, the first information includes a first identifier, in which the first identifier is configured to indicate the change in the system information on the at least one link of the plurality of links.

In some embodiments, the first information further includes a second identifier, in which the second identifier corresponds to the at least one link of the plurality of links.

In some embodiments, the second identifier corresponds to a link with a change in system information, in which determining the link with the change in the system information based on the first message frame includes determining a link with a change in system information in the plurality of links based on the first identifier and the second identifier existing in pairs in the first message frame.

In some embodiments, the second identifier includes a plurality of bits, in which the plurality of bits correspond to the plurality of links, respectively.

In some embodiments, determining the link with the change in the system information based on the first message frame includes determining that a value of the first identifier is changed and a bit of the plurality of bits corresponding to the first link is set to a first value, and determining a link with a change in system information as the first link.

In some embodiments, determining the link with the change in the system information based on the first message frame includes determining that a value of the first identifier has not changed and the at least one bit is set to a first value, and determining that system information has not changed on the first link, and the system information has changed on a link corresponding to at least one bit of the plurality of bits.

In some embodiments, the first information further includes a multi-link device identifier, in which the multi-link device identifier corresponds to a multi-link device to which a link with a change in system information belongs.

In some embodiments, the plurality of links include a second link corresponding to a first multi-link access point device and a second multi-link access point device, in which in the first multi-link access point device, the second link corresponds to a first access point device, and in the second multi-link access point device, the second link corresponds to a second access point device, in which the first information includes a third identifier, which is configured to indicate that a change in system information of the first access point device is the same as a change in system information of the second access point device.

In some embodiments, in which the first information further includes a traffic indication map (TIM) element.

According to a third aspect of the present disclosure, there is provided a multi-link communication device, which is performed by a multi-link access point device. The multi-link communication device includes a processing module configured to determine a first message frame on a first link, in which the first message frame includes first information about a change in system information of an access point device corresponding to at least one link of a plurality of links, and the first message frame indicates a station on the at least one link to receive a second message frame sent by the access point device so as to acquire changed system information, and a communication module configured to send the first message frame.

According to a fourth aspect of the present disclosure, there is provided a multi-link communication device, which is performed by a multi-link station device. The multi-link communication device includes a communication module configured to receive a first message frame on a first link, in which the first message frame includes first information about a change in system information of an access point device corresponding to at least one link of a plurality of links, and a processing module configured to determine a link with a change in system information based on the first message frame and control the communication module to receive a second message frame sent by the access point device to acquire changed system information.

According to a fifth aspect of the present disclosure, there is provided an electronic device. The electronic device includes a memory, a processor, and a computer program stored in the memory and executable on the processor, in which the processor is configured to implement the method as described above when running the computer program.

According to a sixth aspect of the present disclosure, there is provided a computer-readable storage medium. The computer-readable storage medium having stored therein computer programs that, when executed by a processor, cause the method as described above to be implemented.

The technical solutions provided in the illustrative embodiments of the present disclosure may be applied to the changes in the system information on the plurality of links, which improves spectrum utilization efficiency and improves the throughput.

It is to be understood that although the steps in the flowchart of the accompanying drawings are shown in sequence as indicated by arrows, these steps are not necessarily executed in sequence as indicated by the arrows. Unless clearly indicated in the context otherwise, the sequence of execution of these steps is not strictly limited, and these steps can be executed in other sequence. In addition, at least part of the steps in the flowchart of the accompanying drawings may include a plurality of sub-steps or stages. These sub-steps or stages are not necessarily completed at the same moment, but can be executed at different moments, and these sub-steps or stages are not necessarily performed sequentially, but can be executed alternately or alternatively with other steps or at least part of sub-steps or stages of the other steps.

Although the present disclosure has been shown and described with reference to certain embodiments thereof, it will be understood by those skilled in the art that various changes in form and details can be made without departing from the scope of the present disclosure. Therefore, the scope of the present disclosure should not be limited to the embodiments, but should be defined by the appended claims and their equivalents.

What is claimed is:

1. A multi-link communication method, performed by a multi-link access point device, comprising:

sending a first message frame, wherein the first message frame comprises first information about a change in system information of an access point corresponding to at least one link of a plurality of links, the change in the system information comprises a critical update occurring to a basic service set (BSS) parameter, and the first message frame is used to indicate a station corresponding to the at least one link to receive a second message frame sent by the multi-link access point device to acquire changed system information;

wherein the first information comprises a first identifier and a second identifier, the first identifier is configured to indicate the change in the system information on the at least one link of the plurality of links, an increment of a value of the first identifier indicates that the system information of the at least one link of the plurality of links is changed, and the second identifier corresponds to a plurality of bits, the plurality of bits correspond respectively to the plurality of links, and a value of a bit of the second identifier corresponding to a link of which the system information is changed among the plurality of links is set to a first value, the first value is 1.

2. The multi-link communication method of claim 1, wherein the change in the system information is determined on the at least one link of the plurality of links, and the first identifier and the second identifier exist in pairs in the first message frame, wherein the second identifier corresponds to a link with a change in system information.

3. The multi-link communication method of claim 1, wherein the first information further comprises a multi-link device identifier, wherein the multi-link device identifier corresponds to a multi-link device to which a link with a change in system information belongs.

4. The multi-link communication method of claim 3, wherein the plurality of links comprise a second link corresponding to a first multi-link access point and a second multi-link access point, wherein in the first multi-link access point, the second link corresponds to a first access point, and in the second multi-link access point, the second link corresponds to a second access point, wherein the first information comprises a third identifier, which is configured to indicate that a change in system information of the first access point is the same as a change in system information of the second access point.

5. The multi-link communication method of claim 4, wherein the communication method further comprises:

sending a third message frame to carry system information with a same change of the first access point and the second access point.

6. The multi-link communication method of claim 3, wherein the multi-link device identifier is a media access control (MAC) address of the multi-link device.

7. The multi-link communication method of claim 1, wherein the first information further comprises: a traffic indication map (TIM) element, wherein a number of TIM elements is related to at least one of a number of links with changes in system information in the plurality of links, or a number of the plurality of links.

8. The multi-link communication method of claim 1, wherein a value of a bit of the second identifier corresponding to a link of which the system information is not changed among the plurality of links is set to a second value.

9. The multi-link communication method of claim 1, wherein in a case where system information on a first link is not changed and system information on a second link is changed, the value of the first identifier is changed, a value of a bit corresponding to the second link among the plurality of bits corresponding to the second identifier is set to the first value, and a value of a bit corresponding to the first link among the plurality of bits corresponding to the second identifier is set a second value.

10. A non-transitory computer-readable storage medium having stored therein computer programs that, when executed by a processor, cause the method of claim 1.

11. A multi-link communication method, performed by a multi-link station device, comprising:

receiving a first message frame, wherein the first message frame comprises first information about a change in system information of an access point corresponding to at least one link of a plurality of links, and the change in the system information comprises a critical update occurring to a basic service set (BSS) parameter;

determining a link with a change in system information based on the first message frame; and receiving a second message frame sent by the multi-link access point device to acquire changed system information, wherein the first information comprises a first identifier and a second identifier, the first identifier is configured to indicate the change in the system information on the at least one link of the plurality of links, an increment of a value of the first identifier indicates that the system information of the at least one link of the plurality of links is changed, and the second identifier corresponds to a plurality of bits, the plurality of bits correspond respectively to the plurality of links, and a value of a bit of the second identifier corresponding to a link of which the system information is changed among the plurality of links is set to a first value, the first value is 1.

12. The multi-link communication method of claim 11, wherein the second identifier corresponds to a link with a change in system information, wherein determining the link with the change in the system information based on the first message frame comprises determining a link with a change in system information in the plurality of links based on the first identifier and the second identifier existing in pairs in the first message frame.

13. The multi-link communication method of claim 11, wherein the first information further comprises a multi-link device identifier, wherein the multi-link device identifier corresponds to a multi-link device to which a link with a change in system information belongs.

14. The multi-link communication method of claim 13, wherein the plurality of links comprise a second link corresponding to a first multi-link access point and a second multi-link access point, wherein in the first multi-link access point, the second link corresponds to a first access point, and in the second multi-link access point, the second link corresponds to a second access point, wherein the first information comprises a third identifier, which is configured to indicate that a change in system information of the first access point is the same as a change in system information of the second access point.

15. The multi-link communication method of claim 13, wherein the multi-link device identifier is a media access control (MAC) address of the multi-link device.

16. A multi-link station device, comprising:

a processor, and a memory storing a computer program executable by the processor, wherein the processor is configured to implement the multi-link communication method according to claim 11.

17. The multi-link communication method of claim 11, wherein a value of a bit of the second identifier corresponding to a link of which the system information is not changed among the plurality of links is set to a second value.

18. The multi-link communication method of claim 11, wherein in a case where system information on a first link is not changed and system information on a second link is changed, the value of the first identifier is changed, a value of a bit corresponding to the second link among the plurality of bits corresponding to the second identifier is set to the first value, and a value of a bit corresponding to the first link among the plurality of bits corresponding to the second identifier is set a second value.

19. A non-transitory computer-readable storage medium having stored therein computer programs that, when executed by a processor, cause the method of claim 11.

20. A multi-link access point device, comprising:

a processor, and a memory storing a computer program executable by the processor, wherein the processor is configured to:

send a first message frame, wherein the first message frame comprises first information about a change in system information of an access point corresponding to at least one link of a plurality of links, the change in the system information comprises a critical update occurring to a basic service set (BSS) parameter, and the first message frame is used to indicate a station corresponding to the at least one link to receive a second message frame sent by the multi-link access point device to acquire changed system information;

wherein the first information comprises a first identifier and a second identifier, the first identifier is configured to indicate the change in the system information on the at least one link of the plurality of links, an increment of a value of the first identifier indicates that the system information of the at least one link of the plurality of links is changed, and the second identifier corresponds to a plurality of bits, the plurality of bits correspond respectively to the plurality of links, and a value of a bit of the second identifier corresponding to a link of which the system information is changed among the plurality of links is set to a first value, the first value is 1.

* * * * *